US012203629B2

(12) United States Patent
Menn et al.

(10) Patent No.: US 12,203,629 B2
(45) Date of Patent: Jan. 21, 2025

(54) AUTOMOTIVE LIGHTING DEVICE HEAT EXCHANGE SYSTEM WITH AN INTERMEDIATE PORTION HAVING MODIFIED AIR DUCT ARRANGEMENT

(71) Applicant: VALEO VISION, Bobigny (FR)

(72) Inventors: Thibaut Menn, Bobigny (FR); Zhixin Liu, Bobigny (FR); Mathieu Robichon, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/555,732

(22) PCT Filed: Apr. 21, 2022

(86) PCT No.: PCT/EP2022/060639
§ 371 (c)(1),
(2) Date: Oct. 17, 2023

(87) PCT Pub. No.: WO2022/223745
PCT Pub. Date: Oct. 27, 2022

(65) Prior Publication Data
US 2024/0200753 A1 Jun. 20, 2024

(30) Foreign Application Priority Data
Apr. 21, 2021 (FR) ...................................... 2104172

(51) Int. Cl.
*F21S 45/43* (2018.01)
*F21S 45/48* (2018.01)

(52) U.S. Cl.
CPC ............... *F21S 45/43* (2018.01); *F21S 45/48* (2018.01)

(58) Field of Classification Search
CPC .......... F21V 29/60; F21V 29/65; F21V 29/83; F21S 45/43; F21S 45/48
See application file for complete search history.

(56) References Cited

U.S. PATENT DOCUMENTS

2007/0091632 A1 * 4/2007 Glovatsky ............. F21S 41/145 362/547
2009/0196064 A1 * 8/2009 Kracker .................. F21V 29/76 362/547
(Continued)

FOREIGN PATENT DOCUMENTS

CN 112648586 A 4/2021
DE 102007043961 A1 * 3/2009 ............ F21S 41/141
(Continued)

OTHER PUBLICATIONS

Machine translation of DE102007043961A1, retrieved from worldwide.espacenet.com on Jun. 4, 2024 (Year: 2024).*
(Continued)

*Primary Examiner* — Abdulmajeed Aziz
*Assistant Examiner* — Steven Y Horikoshi
(74) *Attorney, Agent, or Firm* — Valeo Vision

(57) ABSTRACT

A heat exchange system of a vehicle lighting device. The heat exchange system includes an air duct that is arranged facing a heat sink for transferring heat by the light sources of the lighting device. The air duct includes an air inlet portion with a first air passage area receiving an airflow into the air duct and an air outlet portion with a second air passage area directing the airflow towards a heatsink. In addition, an intermediate portion is disposed between the air inlet portion and the air outlet portion. The intermediate portion is having a variable cross-section in a non-linear way. The largest section of the intermediate portion is superior to the section of both the first air passage area and the second air passage area.

9 Claims, 4 Drawing Sheets

(56) References Cited

U.S. PATENT DOCUMENTS

| | | | | |
|---|---|---|---|---|
| 2019/0024867 | A1* | 1/2019 | Tsutsumi | F21S 45/60 |
| 2019/0132988 | A1* | 5/2019 | Edlinger | H01L 23/467 |
| 2020/0116327 | A1* | 4/2020 | Spork | F21S 41/141 |

FOREIGN PATENT DOCUMENTS

| | | | |
|---|---|---|---|
| EP | 2607784 | A1 | 6/2013 |
| KR | 20200129768 | A | 11/2020 |

OTHER PUBLICATIONS

European Patent Office, International Search Report (w/English Translation) and Written Opinion of International Application No. PCT/EP2022/060639, dated Aug. 5, 2022.

* cited by examiner

AUTOMOTIVE LIGHTING DEVICE HEAT EXCHANGE SYSTEM WITH AN INTERMEDIATE PORTION HAVING MODIFIED AIR DUCT ARRANGEMENT

TECHNICAL FIELD

The present invention relates to a heat exchange system for an automotive lighting device.

BACKGROUND OF THE INVENTION

The Lighting devices are used in vehicles, specifically automotive vehicle, for lighting the path ahead. These lighting devices of modern times use different types of LED light sources owing to their high efficiency better lighting. Even though the LED light devices are highly efficient, they generate tremendous amount of heat during operation and their performance is particularly sensitive to heat and excessive temperatures. Furthermore, modern lighting devices use multiple lighting modules to meet the lighting requirements of the automotive vehicle. In these devices, the heat generated is significantly high. It is essential that heat generated by the lighting device be transferred away from the lighting devices constantly.

Conventionally, to cool down the multiple light modules, lighting devices are provided with a blower to generate an airflow that is blown over a heat sink of the lighting device by means of air duct. The air ducts are usually fixed on the housing while the modules are designed to move to accommodate aiming functionality. To prevent fouling and avoid interference a minimum distance or clearance has to be maintained between the air duct and the heat sink. For this reason, there is a pressure loss and reduction in air velocity around the heat sink fins. Thus, there is a need to ensure optimum amount of airflow through fin channels to dissipate significant quantities of heat generated by the LED based lighting devices.

The prior art and the conventional methods have various disadvantages as described earlier and there is a need for a heat exchange system for a lighting device of an automotive vehicle that can overcome the above limitations and provide an efficient system for heat transfer in a lighting device.

BRIEF SUMMARY OF THE INVENTION

An object of the present invention is to solve the disadvantages described above of known lighting devices. In particular, the present invention provides a heat exchange system for a lighting device dissipating the heat generated by the light sources.

In particular, the invention provides a heat exchange system for a lighting device that is capable of dissipating heat from a lighting device. More particularly, the invention provides a heat exchange system for a lighting device that is capable of providing air flow having high speed and pressure over the surface of the heat sink.

According to an embodiment of the present invention, there is provided a heat exchange system of a vehicle lighting device including a heatsink and an air duct. The air duct includes:

- an air inlet portion including a first air passage area receiving an airflow into the air duct;
- an air outlet portion comprising including a second air passage area directing the airflow towards a heatsink of the heat exchange system;

- an intermediate portion disposed between the air inlet portion and the air outlet portion, the intermediate portion having a variable cross-section in a non-linear way, the largest section of the intermediate portion being superior to the section of both the first air passage area and the second air passage area.

Further, the air duct is arranged in such a way that the air outlet portion is facing the heatsink.

In the air duct of the proposed heat exchange system, the air from the air inlet portion enters the intermediate portion that is configured to be bigger than the air inlet portion. This enables a large amount of air to enter the air duct.

Further, the air outlet portion that is configured to receive air from the intermediate portion has a smaller section compared to both air inlet portion and intermediate portion. The air outlet portion being smaller as compared to other portions of the air duct receives large amount of air that will go out of the air duct. Due to this change in size of the outlet portion section, a Venturi effect is created at the air outlet portion, thus increasing the velocity and pressure of the air. Further, the flow may be converted to laminar flow that is having high velocity. The high velocity air is then blown over the heat sink to remove the heat through forced convection.

Further, the heat sink is arranged facing the outlet portion to ensure maximum air is blown over the heat sink surface.

Thus, the proposed heat exchange system enables flow of high-speed air from the air outlet portion directly on to the heat sink. Further, energy losses which may arise due to non-directed flow may be avoided.

In a non-limiting embodiment of the present invention, the largest section of the intermediate portion of the air duct may be located closer to the air outlet portion as compared to air inlet portion. This enables high velocity air at the air outlet portion by preventing energy losses.

In an embodiment of the present invention, the cross-section of the intermediate portion may vary in a continuous way.

For example, the cross-section of the intermediate portion may increase continuously from a junction with the inlet portion to reach the largest section, then it decreases continuously to the junction with the outlet portion. Here, the junction between the inlet portion and the intermediate portion can be further called an input end of the intermediate portion. In a same manner, the junction between the intermediate portion and the outlet portion can be further called the output end of the intermediate portion.

In another embodiment, the cross-sectional surface area varies in steps. For example, the intermediate portion can be divided into a plurality of sub-portions wherein each sub-portion have a constant transverse profile over its length and wherein the sub-portions have different cross-sectional surface areas from one sub-portion to another. Alternatively, the intermediate portion includes some of the sub-portions with a constant transverse profile over its length and some others having a tapered transverse profile, i.e. increasing from one end to another end.

In a non-limiting embodiment of the present invention, the intermediate portion of the air duct may comprise a lateral wall composed of a first segment and a second segment, the second segment presenting a curvilinear profile. The intermediate portion thus configured has a curvilinear L-shape profile. The curvilinear profile enable smooth flow of the air inside the air duct and may reduce the resistance to the flow of air.

In a non-limiting embodiment of the present invention, the intermediate portion of the air duct may include an air directing rib extending in the direction of airflow for directing the air towards the air outlet portion. This enables the air to be uniformly distributed towards the air outlet portion from the air inlet portion.

In a non-limiting embodiment of the present invention, the air directing ribs may present a curvilinear profile similar to the second air passage area. The curvilinear profile enable smooth flow of the air inside the air duct and contribute to reduce the resistance to the flow of air.

In a non-limiting embodiment of the present invention, the air outlet portion of the air duct may include a plurality of air holes forming a through zone permitting the air to flow from the intermediate portion toward the heatsink. The through zone forms the second air passage area. This arrangement enables directed airflow towards the heat sink enabling better heat transfer efficiency. In fact, when passing from the intermediate portion to the air outlet portion, the air flow is divided into several air streams flowing through the through holes with the smaller sections, thus increasing the flow velocity to the heat sink. The plurality of air holes enables directed and controlled airflow towards the heat sink at high velocity. This ensures maximum amount of air is directed towards the heat sink and minimizing wastage.

The air outlet portion may further include a blocking zone preventing the air from reaching the heatsink.

In a non-limiting embodiment of the present invention, the plurality of air holes may be embedded in a solid support. Here the solid support forms a blocking zone preventing the air from reaching the heatsink.

In a non-limiting embodiment of the present invention, the plurality of air holes may have a circular profile.

In a non-limiting embodiment of the present invention, the plurality of through air holes may be shaped like a nozzle. Nozzle shaped air holes increase the velocity and pressure of the airflow. This ensures high velocity air to be directed towards the heat sink.

In a non-limiting embodiment of the present invention, the air passage area of the outlet portion may be smaller than the air passage area of the inlet portion.

In an embodiment, the air passage area of the inlet portion is greater or equal to 70% of the air passage area of the outlet portion. This allows to a balance between the high air velocity of the pressure loss inside the air duct.

In a non-limiting embodiment of the present invention, the heatsink may include a plurality of fins extending parallel from each other, a channel being delimited between two adjacent fins. The air outlet portion may include a plurality of air holes forming a through zone permitting the air to flow from the intermediary portion toward the heatsink, each air hole facing a corresponding channel. The plurality of fins enable heat transfer natural convection and the air being directed to the fins further enables heat transfer by means of forced convection. This enables increase in efficiency of the heat transfer.

In an embodiment of the present invention, the heat exchange system may further include a blower drawing the air into the air duct. The air inlet portion may be adapted to engage with said blower.

Another object of the invention is to provide a vehicle lighting device with a high thermal dissipation capacity. The lighting device may be a module that can be mounted in a headlamp or in a rear lamp of a vehicle.

The lighting device includes the above-described heat exchange system and a light source. The heatsink of the heat exchange system is in thermal contact with the light source to evacuate the heat generated by the light source.

For example, the light source may include at least one Light Emitting Diode (LED).

In an embodiment, the lighting device further includes a controller for controlling the light source. The heatsink of the heat exchange system is in thermal contact with the controller to evacuate the heat generated by the controller.

In an embodiment, the heatsink serves as a support for the light source and for other electronic and electrical components that control and power the light source. These components and the light source can be arranged on a same printed circuit board (PCB) that is mounted on one side of the heatsink. In addition, the heatsink can also support optical elements such as reflectors.

In addition, the air duct may be arranged by giving a clearance area to enable movement of both the light source and the heatsink to enable aiming adjustment and also to prevent fouling.

The present invention also relates to a vehicle and in particular an automotive vehicle, comprising the above-described the lighting device. A vehicle may include a self-driving vehicle or a vehicle driven by a human being for the transportation of human beings, animals or objects.

BRIEF DESCRIPTION OF THE DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

DETAILED DESCRIPTION OF THE INVENTION

Figure 1A:
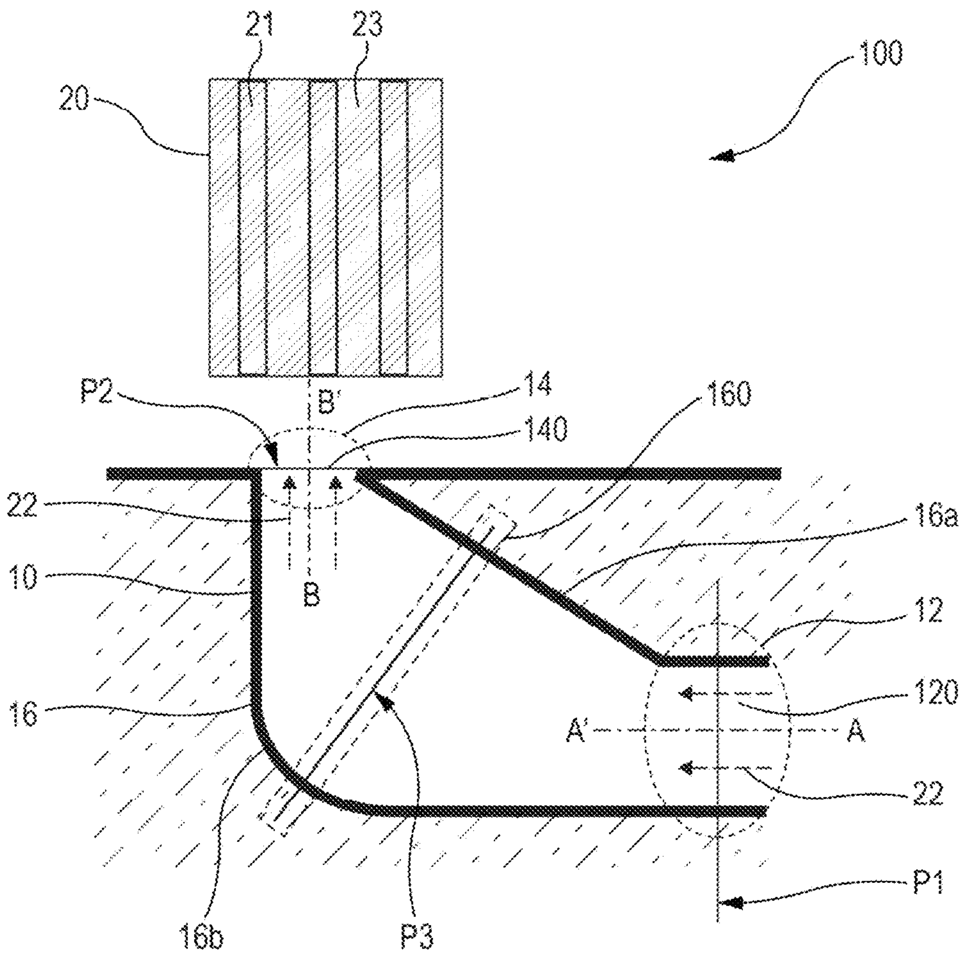
FIG. 1*a* shows a cross sectional view of a heat exchange system including an air duct and a heat sink, according to a first embodiment of the present invention.

Hereinafter, embodiments of the present invention will be described with reference to the accompanying drawings.

The definitions given below correspond to the described embodiments.

Inlet Portion 12 or 212:

An air inlet portion 12 or 212 may be defined as the portion of the air duct that is adapted to allow air to enter the air duct. Further, the air inlet portion may be adapted to engage with a blower drawing the air into the air duct. Further, the air inlet portion may be designed to match the profile of the blower or in some cases may be configured to have multiple air inlet portions.

First Air Passage Area 120 or 320:

A first air passage area 120 or 320 may be defined as the area of the of air inlet portion that is adapted to receive the air from the outside. Further, the first air passage area 120 or 320 can be characterized by its size, e.g. its surface area. Said surface area, or first surface area, may be obtained from the first section S1 that can be defined as the section obtained by a plane P1 that is perpendicular to the principal axis A-A' of the air inlet portion 12 or 212.

Outlet Portion 14 or 214:

An air outlet portion 14 or 214 may be defined as the portion of the air duct that is adapted to direct the air from the air duct towards a heat sink. The air outlet portion may be configured to have different profiles adapted to direct high velocity air towards the heat sink. Further, the air outlet portion may be placed in proximity to the heat sink.

Second Air Passage Area 140 or 340:

A second air passage area 140 or 340 may be defined as the area of the air outlet portion that is adapted to let the air exiting the air duct, preferably with a higher velocity. The second air passage area 140 or 340 may be configured to have different shapes and profiles. Further, the second air passage area 140 or 340 can be characterized by its size, e.g. its surface area. Said surface area, or second surface area, may be obtained from a second section S2 that can be defined as section obtained by a plane P2 that is perpendicular to the principal axis B-B' of the air outlet portion 14 or 214.

Intermediate Portion 16 or 216:

An intermediate portion 16 or 216 may be defined as the portion of the air duct that connects the air inlet portion with the air outlet portion. The intermediate portion may be configured to act as an air accumulation portion of the air duct.

A heat exchange system 100 according to a first embodiment of the present invention is described here after.

As shown in FIG. 1*a*, the heat exchange system 100 includes an air duct 10 and a heat sink 20. FIG. 1*a* is a cross sectional view of the heat sink 20 associated with the duct 10.

The air duct 10 as shown in FIG. 1*a* includes an air inlet portion 12 comprising a first air passage area 120 receiving an airflow 22 into the air duct 10 and an air outlet portion 14 comprising a second air passage area 140 directing the airflow 22 towards a heatsink 20 of the heat exchange system 100. The first air passage area 120 is defined as the area through which the air flows into the air duct. The first air passage area 120 may be configured to receive air from a blower that is arranged near the first air passage area or in some case arranged directly at the first air passage area 120.

In the illustrated embodiment shown in FIG. 1*a*, the first air passage area 120 presents a circular cross section. Said circular cross section, otherwise called first section, is obtained by a plane P1 that is perpendicular to the principal axis A-A' of the air inlet portion 12. Further, in the example shown, the first section has a first surface area S1.

In like manner, the second air passage area 140 presents a circular cross section. Said cross section, otherwise called second section, is obtained by a plane P2 that is perpendicular to the principal axis B-B' of the air outlet portion 14. In the exemplar shown, the second section has a second surface area S2.

Furthermore, the air duct 10 comprises an intermediate portion 16 disposed between the air inlet portion 12 and the air outlet portion 14, wherein the intermediate portion 16 is having a variable cross-section in a non-linear way.

Here, the section of the intermediate portion 16 is gradually increasing from a junction with the inlet portion 12, i.e. its input end, to reach the largest section S3, then it gradually decreasing up to the junction with the outlet portion 14, i.e. its output end. The largest section S3 is located in an area designated by the reference 160 in FIG. 1*a*. Here, the largest section S3 is the section of a plane P3 perpendicular to the area 160.

According to the invention and in the illustrated embodiment, the largest section S3, further called maximum section or third section S3, is superior to the section of both the first air passage area 120 and the second air passage area 140. In other words, the third section S3 presents a third surface area that is greater than the surface are of the section S1 and S2 of both the first air passage area 120 and the second air passage area 140.

In addition, in the shown embodiment, the intermediate portion 16 comprises a lateral wall composed of a first segment 16*a* and of a second segment 16*b*. The first segment 16*a* and the second segment 16*b* are configured to connect the inlet portion 12 and the outlet portion 14. The second segment 16*b* of the intermediate portion 16 is configured to have a curvilinear profile. Thus, the intermediate portion 16 presents a curvilinear L-shape profile enabling a smooth flow of the air flow air across the air duct.

Figure 1B:
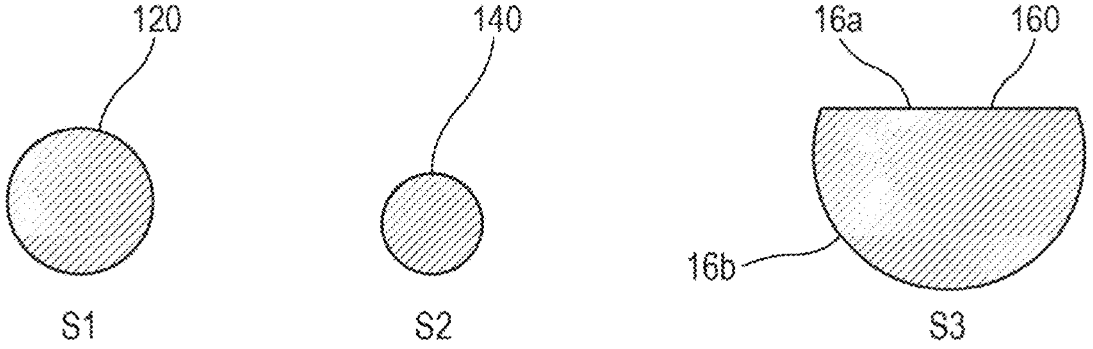
FIG. 1*b* shows a cross sectional view of the air passage areas of the air duct of FIG. 1*a*, according to the first embodiment of the present invention.

FIG. 1*b* shows the cross sections of the air duct 10 across the first air passage area 120, the second air passage area 140 and the area 160 across the maximum section of the respective portions of the air duct 10 as disclosed earlier. It can be seen that the second section S2 across the second air passage area 140 of the outlet portion 14 is smaller than the first section S1 across the first air passage area 120 of the inlet portion 12.

Further, in the embodiment shown, the area 160 presenting the maximum section S3 of the intermediate portion 16 is configured to be larger than the first air passage area 120 and the second air passage area 140. The arrangement of the first section S1 and the maximum section S3 enables high volume of air to enter the air duct 10. The intermediate portion 16 serves as a storage reservoir for the high volume of incoming air.

Further, the maximum section S3 is located closer to the second air passage area 140 to enable high volume of air to flow rapidly towards the air outlet portion 14. At the same time, the narrowing of the section in the air duct towards the air outlet portion 14 increases the internal pressure and the flow velocity of the airflow 22 towards the heat sink 20. Thus, the airflow coming out of the air duct 10 forms a strong jet of air directed directly towards the heat sink 20.

The heat sink 20 of the heat exchange system 100 is arranged to receive air from the outlet portion 14 of the air duct 10.

In the illustrated embodiments shown in FIG. 1*a*, the heat sink 20 is configured to include a plurality of fins 21 extending parallel from each other. The air duct 10 is arranged in such a way that the second air passage area 140 is facing the heatsink 20 to direct air uniformly over the heat sink 20 and the plurality of fins 21. The air by means of forced convection carries the heat from the heat sink.

Figure 2A:
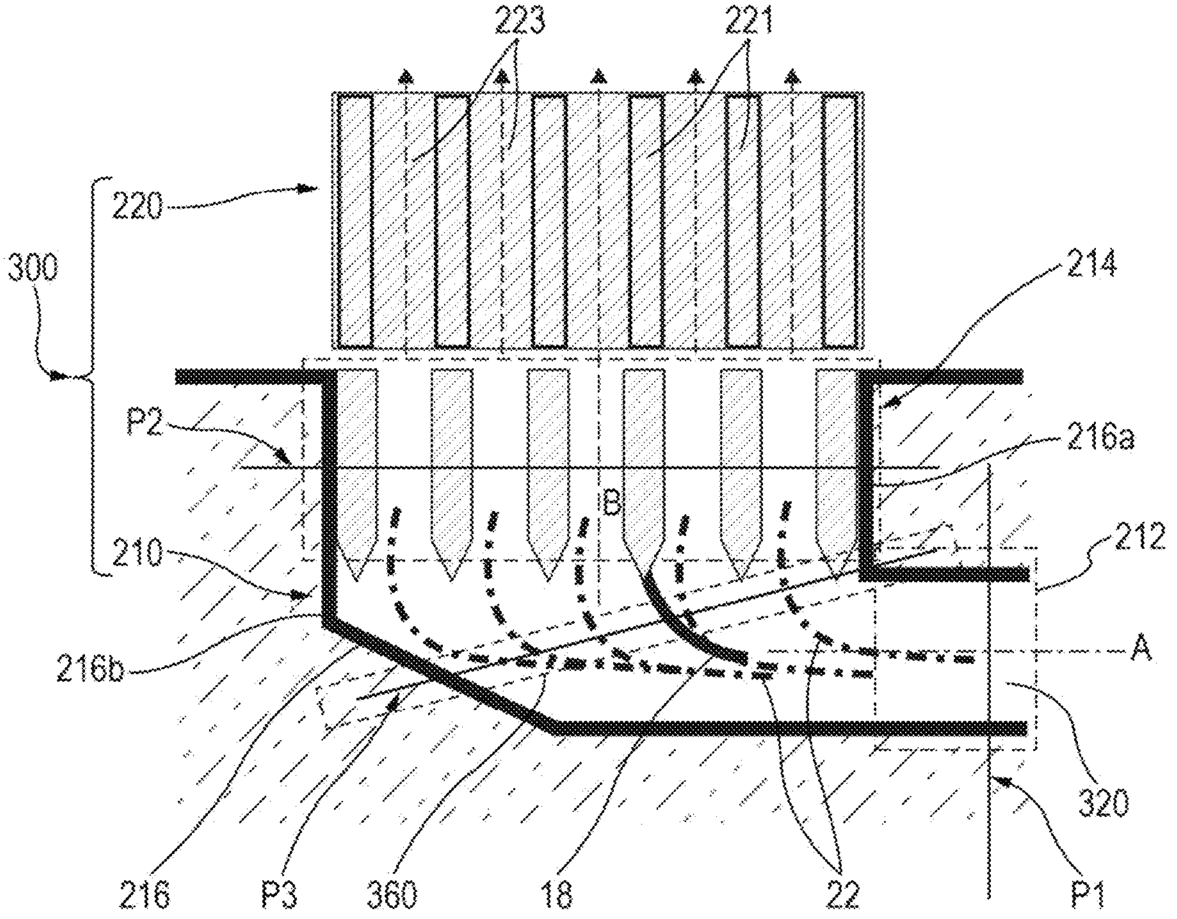
FIG. 2*a* shows a cross sectional view of a heat exchange system including an air duct and a heat sink, according to a second embodiment of the present invention.

FIG. 2*a* shows a second embodiment of the present invention. The reference numbers of the first embodiment (FIG. 1*a* and FIG. 1*b*) are used to designate the same or corresponding elements. However, these numbers are increased by 200.

In this second embodiment, the heat exchange system 300 has similar features as the first embodiments, except the features described here after.

Here, the heat exchange system 300 includes an intermediate portion 216 includes an air directing rib 18 extending along the direction of airflow 22 for directing the air towards the air outlet portion 214. In an alternate embodiment (not shown), the intermediate portion may include plurality of air directing ribs 18 formed in the direction of airflow 22. In the said embodiment, the plurality of ribs 18 may be placed at equal interval or at irregular intervals.

Figure 2B:
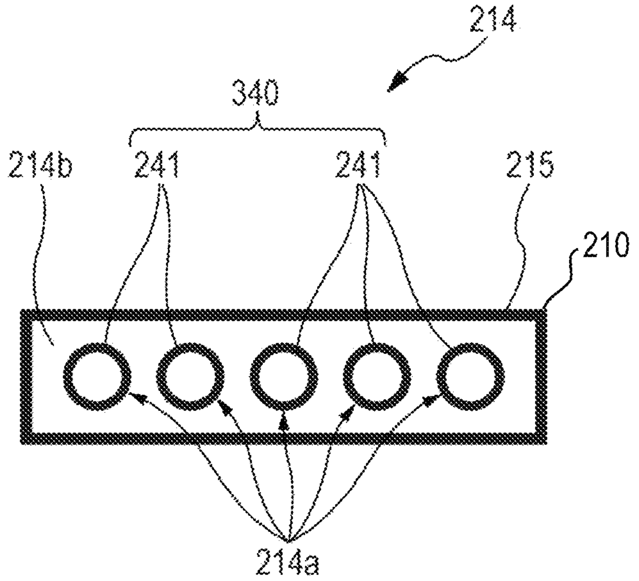
FIG. 2*b* shows a top view of the air duct of FIG. 1*a*, according to the second embodiment of the present invention.

FIG. 2*b* shows a top view of the air outlet portion 214 of the air duct 210. The air outlet portion 214 includes a through zone 214*a* permitting the air to flow toward the heatsink 220 and a blocking zone 214*b* preventing the air from reaching the heatsink 220.

As seen in the FIG. 2*b*, the through zone 214*a* includes a plurality of air holes 241 embedded in a solid support 215 for directing the air towards the heatsink 220.

In the illustrated embodiment, the solid support 215 is be configured to include a plurality of perforated portion and a non-perforated portion. The perforated portion forms a plurality of air holes 241 that are configured to have a circular profile. In an alternate embodiment the plurality of air holes 241 are shaped like a nozzle. The non-perforated portion is configured to act as the blocking zone 214*b* and the plurality of perforated portion in form of holes is configured to act as the through zone 214*a*.

The through zone 214*a* forms the second air passage area 340. In this case, the combined cross-section of all the air holes is the second section S2 presenting the second surface area.

The said second section is configured to be smaller than the first section of the first air passage area 320 of the inlet portion 212. The second section S2 is also smaller than the maximum section of the intermediate portion 216.

The section of the air duct is decreasing between the area 360 and the beginning of the outlet portion 214, which enhances the air velocity of the airflow. The section becomes even smaller in the outlet portion 214 because of the division into the plurality air holes 241. Consequently, the velocity of the airflow flowing inside each air holes is further increased to improve the heat transfer efficiency of the air duct.

In the embodiment shown in FIG. 2*a*, the heat sink 220 includes a plurality of fins 221 extending parallel from each other. A channel 223 is delimited between two adjacent fins 21. Further, the air duct 210 and the heat sink 220 are arrange such that each air hole 241 is facing a corresponding channel 223 of the heat sink. The air from the air holes is directed towards the corresponding channel 223 and carry heat by means of forced convection.

In an embodiment of the present invention, the heat exchange system further includes a blower configured to generate air for enabling heat transfer. The air generated by the blower is directed towards the heat sink through the air duct.

The outlet portion of the air duct as disclosed in both the embodiment as shown in FIG. 1*a* and/or FIG. 2*a* may enable an efficient air transfer to the heat sink.

Although the present disclosure provides references to figures, all embodiments shown in the figures are intended to explain preferred embodiments of the present invention by way of example rather than being intended to limit the present invention.

What is claimed is:

1. A heat exchange system of a vehicle lighting device comprising a heatsink and an air duct, the air duct including:
- an air inlet portion including a first air passage area receiving an airflow into the air duct;
- an air outlet portion including a second air passage area directing the airflow towards the heatsink, wherein the second air passage area of the outlet portion of the air duct is smaller than the first air passage area of the inlet portion; and
- an intermediate portion disposed between the air inlet portion and the air outlet portion, wherein the intermediate portion has a variable cross-section with a non-linear form, and wherein a largest section of the intermediate portion is superior to each section of both the first air passage area and the second air passage area; and
- wherein the air duct is arranged such that the air outlet portion faces the heatsink.

2. The heat exchange system as claimed in claim 1, wherein the largest section of the intermediate portion of the air duct is located closer to the air outlet portion as compared to the air inlet portion.

3. The heat exchange system as claimed in claim 1, wherein the intermediate portion of the air duct includes a lateral wall composed of a first segment and of a second segment, the second segment presenting a curvilinear profile.

4. The heat exchange system as claimed in claim 1, wherein the intermediate portion of the air duct includes an air directing rib extending in the direction of airflow for directing the air towards the air outlet portion.

5. The heat exchange system as claimed as claimed in claim 4, wherein the air directing ribs presents a curvilinear profile.

6. The heat exchange system as claimed in claim 1, wherein the air outlet portion of the air duct includes a plurality of air holes forming a through zone permitting the air to flow from the intermediate portion toward the heatsink.

7. The heat exchange system according to claim 1, wherein the heatsink includes
- a plurality of fins extending parallel from each other;
- a channel being delimited between two adjacent fins;
- wherein the air outlet portion of the air duct includes a plurality of air holes forming a through zone that is configured to permit the air to flow from the intermediate portion toward the heatsink; and
- wherein each air hole faces a corresponding channel.

8. A vehicle lighting device comprising a heat exchange system with a heatsink and an air duct, the air duct including:
- an air inlet portion including a first air passage area receiving an airflow into the air duct;
- an air outlet portion including a second air passage area directing the airflow towards the heatsink of the heat exchange system, wherein the second air passage area of the outlet portion of the air duct is smaller than the first air passage area of the inlet portion; and
- an intermediate portion disposed between the air inlet portion and the air outlet portion, wherein the intermediate portion has a variable cross-section with a non-linear form, and wherein a largest section of the intermediate portion is superior to each section of both the first air passage area and the second air passage area;
- wherein the air duct is arranged such that the air outlet portion faces the heatsink; and
- a light source, wherein the heatsink is in thermal contact with the light source to dissipate heat generated by the light source.

9. The vehicle lighting device according to claim 8 further including a controller for controlling the light source, wherein the heatsink of the heat exchange system is in thermal contact with the controller, wherein the heatsink of the heat exchange system is configured to dissipate heat released by the controller.

* * * * *